Feb. 13, 1923.
S. A. WHERRY.
OSCILLATING TOOTH SAW.
FILED NOV. 11, 1919.
1,445,376.
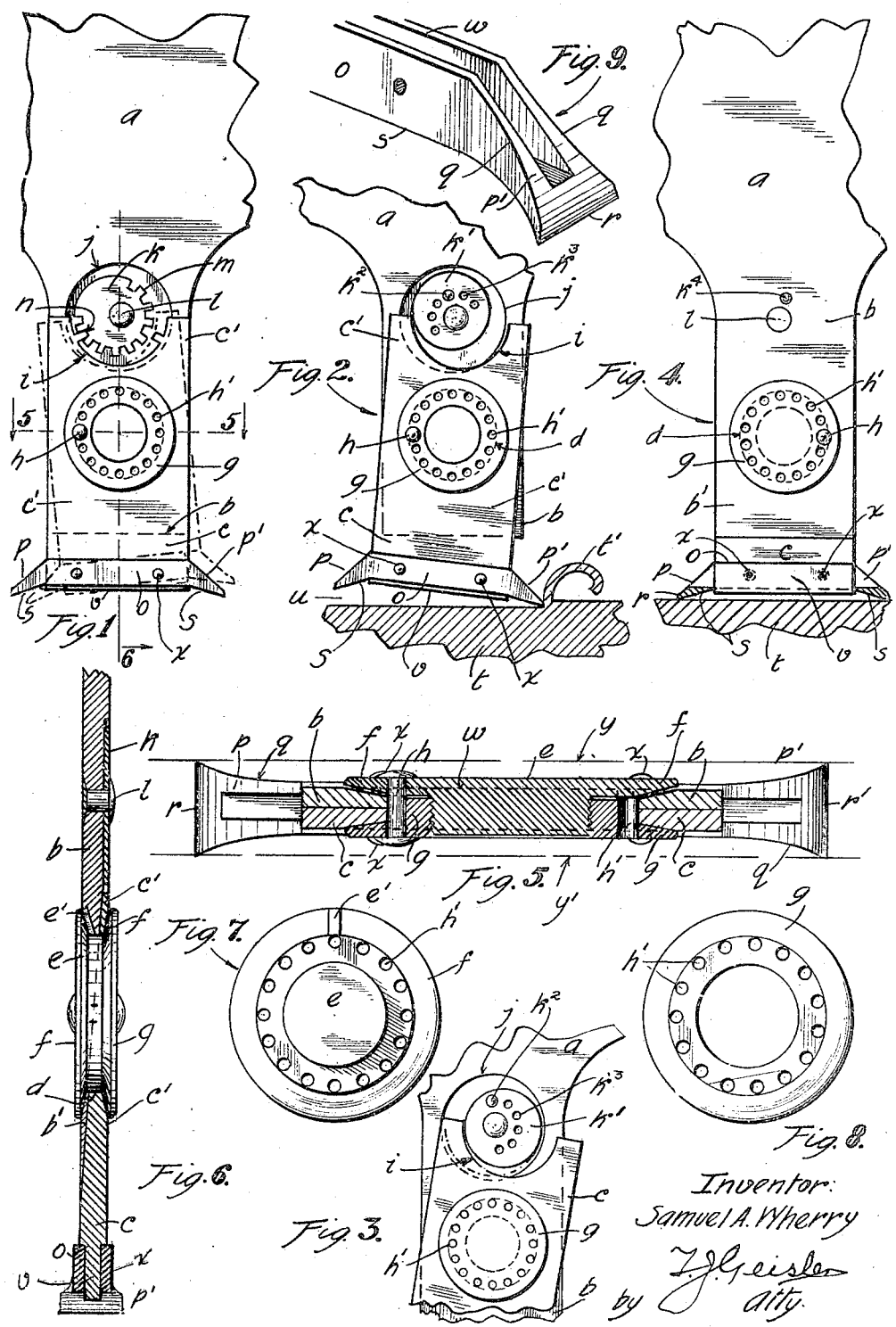
Inventor:
Samuel A. Wherry Patented Feb. 13, 1923.

1,445,376

UNITED STATES PATENT OFFICE.

SAMUEL A. WHERRY, OF PORTLAND, OREGON.

OSCILLATING-TOOTH SAW.

Application filed November 11, 1919. Serial No. 337,253.

*To all whom it may concern:*

Be it known that I, SAMUEL A. WHERRY, a citizen of the United States, and a resident of Portland, county of Multnomah, State of Oregon, have invented a new and useful Improvement in Oscillating-Tooth Saws, of which the following is a specification.

My invention relates principally to cross-cut and other saws, to be used in operating on timber and lumber.

In the lumbermen's cross-cut saws two types of teeth are necessarily provided: the "cutters," which cut the sides of the kerf, and the "rakers" which plane or shave away the bottom of the kerf to deepen it.

In my improved saw I require only one type of teeth, but these are adapted for performing the operations of both said cutters and rakers.

In said prior type of cross-cut saw, the cutter teeth being resilient are sometimes crowded in while working in some portions of the timber, hence make a narrow kerf, and if the cutters are dull, the saw is bound by undue friction on its sides, making the work hard.

The teeth of my saw cannot be compressed because of their solid construction hereinafter described, and they provide ample clearance, for only their cutting edges bear against the sides of the kerf so that the saw clears itself at all times.

Further benefits obtained by my invention are the following features:

The teeth of my saw are pivoted to the body of the saw, so as to be adapted to have some slight play or oscillation in both directions in the plane of the saw, for promoting their work; the oscillation being controlled by stops, relatively to the work, and also for the purpose of causing the teeth to act more or less as scrapers during the return stroke of the saw.

The cutting portions or members of the teeth are removable for sharpening, or replacement by new cutting members when too much worn in service.

Finally it is also my object to make my saw embody all of said features in as practical and simple a form as possible.

The details of construction of my saw are illustrated in the accompanying drawings.

In such drawings Fig. 1 presents a fragmental side elevation of a cross-cut saw embodying my invention. This figure also illustrates one type of devices by which the saw-tooth is pivotally supported on the body of the saw, thus permitting the tooth some slight oscillation or play in the direction of the stroke of the saw, or, in other words in the plane of the saw; and further illustrates one type adjustable means for controlling the oscillations of the tooth; the controlling devices shown in Fig. 1 being adjusted to permit the tooth to oscillate.

Fig. 2 is a view similar to Fig. 1, but in this view the devices controlling the oscillation of the tooth are so adjusted as to permit the latter to oscillate in both directions; Fig. 2 also diagrammatically illustrates the working of the teeth of my saw;

Fig. 3 is a detail illustrating the adjustment of said controlling devices so as to permit the tooth some oscillation in one direction but opposite to that permitted by the adjustment of said devices as illustrated in Fig. 1;

Fig. 4 shows a fragmental rear elevation of my saw and one of its teeth, with the devices controlling the oscillations of the latter arranged as in Fig. 1; and the removable cutting portion or member of the saw tooth is shown in longitudinal section; this figure also illustrates diagrammatically the position of the tooth relative to the bottom surface of the kerf cut by it when making a back stroke, in one mode of the tooth's oscillating adjustment;

Fig. 5 is a larger scale cross horizontal section on the line 5—5 of Fig. 1 looking in the direction indicated by the arrow;

Fig. 6 is a vertical section of the broken line 6—6 of Fig. 1;

Fig. 7 is a detail of the stud or piece by which the tooth is removably and pivotally fastened to a projecting portion of the saw body, such portion constituting the root-base of the saw-tooth;

Fig. 8 is a detail of a washer also a part of said tooth-fastening means; and

Fig. 9 is a partial perspective view of one end of the removable cutting portion or member of a tooth.

The saw $a$ is made with projecting root portions or bases $b$, having tapered extremities $b'$, as shown by Fig. 6

On these root-bases are mounted the saw teeth $c$, the portions $c'$ of which taper in cross-section as illustrated in Fig. 6, so that said portions $b'$ and $c'$ are adapted to overlie each other and form parallel exterior surfaces. The saw teeth $c$ may be pivotally attached to the root-bases $b$ in the manner more clearly illustrated in Fig. 6; both said shank portions being made with circular openings $d$ in which is inserted a pivotal fastening. The latter may consist of a stud-screw $e$ having a beveled flange $f$ (see Fig. 7); the hole of the saw tooth being preferably counter-sunk. $g$ is a nut (see Fig. 8) having a beveled peripheral flange for seating in the counter-sunk hole of the shank of the root base for the tooth. See Fig. 5.

The saw tooth $c$ oscillates on the nut $g$, which is made with a smooth periphery. The stud screw $e$ is made with a radial lug $e'$ fitting in a cavity therefor provided in the root-base $b$, thereby holding the stud-screw against rotation.

The sleeve nut $g$ is held against inadvertent rotation, after having been properly adjusted, by a rivet $h$, inserted thru peripheral holes $h'$ provided in both the stud-screw $e$ and the sleeve nut $g$.

In order to control the play of the tooth, the upper end of its shank may be made with a concavity $i$; the root-base $b$ is made with a circular recess $j$, and therein is seated a cam $k$, pivoted in place by a rivet $l$. The periphery of the cam $k$ may be made with cogs or teeth $m$ meshing with a cog or tooth $n$ provided on the concaved edge of the shank of the saw tooth, as illustrated in Figs. 1, for the purpose of giving the parts positive engagement; but such construction is optional. The cam $k$ may also be made without teeth or cogs, as illustrated by $k'$ in Figs. 2, and 3. As obvious, the purpose of the cam $k$, or the cam $k'$ and the related parts, is to limit the play or oscillation of the saw-tooth. A cam of the type $k'$ is preferably secured against inadvertent rotation by a rivet-pin $k^2$ inserted thru one of a series of holes $k^3$ in the cam concentric with the axis of rotation of the latter and arranged for registration with a hole $k^4$ in the root base $b$, seen in Fig. 4.

With the adjustment of the cam as shown in Fig. 1; the saw-tooth will have limited play and as the parts are arranged in Figs. 2 and 3 oscillation or play in both directions is permitted.

Since each of the teeth of my saw is adapted to function both as a cutter and a raker, I need use only one type of tooth. In short, the teeth of my saw may be said to do their work in similar manner as the plane-iron or bit of a plane, or the gouge.

In order to adapt my saw teeth for operating as mentioned, they are constructed as more clearly shown in Figs. 5 and 9; and in order to facilitate the sharpening of the cutting portions or members and permit their replacement by other cutting members when badly worn in service, I prefer to make said cutting members removable as shown, by the pieces $o$.

The latter are of elongate form and have chisel ends $p$, $p'$, the sides of the chisel ends flare outward as at $q$. The extremities of said chisel ends terminate in cutting edges as at $r$ and $r'$. Since the middle portion of the cutting members $o$ recede, the friction of the sides of the kerf cut on my saw is greatly reduced, for the kerf sides bear merely on the cutting points of said cutting members as illustrated by the lines $y$ and $y'$, representing the sides of the kerf.

The underside of the cutting member $o$ is recessed at its middle part as at $s$, with the end portions inclined towards the extremities so as to provide a clearing for the shavings that may lie in the bottom of the kerf. Assuming the cutting member to be positioned and operating as shown in Fig. 2 (in which $t$ represents that portion of the wood below the bottom of the kerf, and $t'$ a shaving), the tooth would be so tilted as to permit the shaving to pass out at the opening $u$.

The teeth of my saw may be so adjusted as to cut in one direction only, and causing the cutting edges of the cutting members to glide over the bottom of the kerf as indicated in Fig. 4, during the return stroke of the saw, in this way causing the cutting members to act as scrapers clearing the bottom of the kerf of shavings.

In order to firmly attach the cutting members $o$ to the bottom end of the root base, the latter is made with a tongue $v$ adapted for being set into the groove $w$, of the cutting member, and the cutting member is secured in place by rivet-pins $x$.

The holes $g'$, $h'$ also serve as lubricating oil containers.

In order to facilitate the manufacture of the cutting-members $o$, these may be made of a channel steel, that is, having a longitudinal channel as shown in Fig. 9, thereby providing the groove for the tongue $v$ of the saw-tooth root base $c$, but leaving ample stock at the ends to serve as shoulders for the end-faces of said tongue to bear against.

I claim:

1. In a saw, a body provided with perpendicularly projecting root bases, a saw tooth having an elongate shank pivotally mounted at its longitudinal middle on each root-base, and having oscillation in the plane of the saw, and an adjustable stop to limit the rocking of said shank on its pivot.

2. In a saw, a body provided with perpendicularly projecting root bases, a saw tooth having an elongate shank pivotally mounted at its longitudinal middle on each root-base, and having oscillation in the plane of the saw, the pivotal connection of the shank to its base being movable to vary relatively the degree of said oscillation, an adjustable stop to limit the rocking of said shank on its pivot.

3. In a saw, a body provided with perpendicularly projecting root bases, a saw tooth having an elongate shank pivotally mounted at its longitudinal middle on each root-base, and having oscillation in the plane of the saw, the upper end of the shank being provided with a recess, and eccentric means mounted on the root base, in said recess, to limit the rocking of said shank on its pivot.

4. In a saw, a body provided with perpendicularly projecting root bases, a saw tooth having an elongate shank pivotally mounted at its longitudinal middle on each root-base, and having oscillation in the plane of the saw, the pivotal connection of the shank to its base being movable to vary relatively the degree of said oscillation, the upper end of the shank being provided with a recess, and eccentric means mounted on the root base, in said recess, to limit the rocking of said shank on its pivot.

SAMUEL A. WHERRY.